United States Patent
Tang et al.

(10) Patent No.: US 8,373,323 B2
(45) Date of Patent: Feb. 12, 2013

(54) CONTROL BOX FOR MOTOR

(75) Inventors: Songfa Tang, Zhongshan (CN); Yong Zhao, Zhongshan (CN)

(73) Assignee: Zhingshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/206,496

(22) Filed: Aug. 9, 2011

(65) Prior Publication Data
US 2011/0291502 A1 Dec. 1, 2011

Related U.S. Application Data

(63) Continuation of application No. PCT/CN2010/070357, filed on Jan. 26, 2010.

(30) Foreign Application Priority Data

Apr. 16, 2009 (CN) .................... 2009 2 0055048 U

(51) Int. Cl.
*H02K 5/22* (2006.01)
*H02K 11/00* (2006.01)
*H02K 5/04* (2006.01)

(52) U.S. Cl. ............. 310/89; 310/88; 310/71; 310/68 A; 310/DIG. 6

(58) Field of Classification Search .................... 310/89, 310/71, 68 A, DIG. 6; *H02K 5/04, 5/22, H02K 11/00*
See application file for complete search history.

(56) References Cited

U.S. PATENT DOCUMENTS

| 3,841,321 | A | * | 10/1974 | Albach et al. ................... 601/72 |
| 5,119,466 | A | * | 6/1992 | Suzuki .......................... 388/831 |
| 6,011,335 | A | * | 1/2000 | Belley ............................. 310/89 |
| 6,734,589 | B2 | * | 5/2004 | Kogure et al. ................... 310/89 |
| 7,898,124 | B2 | * | 3/2011 | Huang et al. ............... 310/49.18 |
| 2008/0018184 | A1 | * | 1/2008 | Seufert et al. ............... 310/68 B |
| 2009/0284199 | A1 | * | 11/2009 | Kitanaka ................... 318/400.24 |
| 2012/0160596 | A1 | * | 6/2012 | Yamasaki ..................... 180/443 |

FOREIGN PATENT DOCUMENTS

| DE | 19509130 | * | 9/1995 |
| JP | 2008301541 | * | 12/2008 |

OTHER PUBLICATIONS

Machine translation of DE19509130, Yamano et al., Sep. 1995.*
Machine translation of JP2008301541, Mizutani et al., Dec. 2008.*
Partial translation of DE19509130, Yamano et al., Sep. 1995.*

* cited by examiner

*Primary Examiner* — Quyen Leung
*Assistant Examiner* — Terrance Kenerly
(74) *Attorney, Agent, or Firm* — Matthias Scholl P.C.; Matthias Scholl

(57) ABSTRACT

A motor, including: a body, including a housing, a stator, and a rotor; and a controller, including a control box, and a control board. The body is disposed at the top of the motor. The controller is disposed at the bottom of the motor. The control board is disposed in the control box. A debug window is disposed on side wall or at the bottom of the control box. A sealing cover is disposed on the debug window. The sealing cover can be opened. The control board can be exposed for wire connection, adjustment of parameters of electronic components, and fixation of a rotating shaft according to requirements of users for installation and use.

8 Claims, 7 Drawing Sheets

CONTROL BOX FOR MOTOR

CROSS-REFERENCE TO RELATED APPLICATIONS

This application is a continuation of International Patent Application No. PCT/CN2010/070357 with an international filing date of Jan. 26, 2010, designating the United States, now pending, and further claims priority benefits to Chinese Patent Application No. 200920055048.7 filed on Apr. 16, 2009. The contents of all of the aforementioned applications, including any intervening amendments thereto, are incorporated herein by reference.

BACKGROUND OF THE INVENTION

1. Field of the Invention

The invention relates to a motor.

2. Description of the Related Art

Nowadays, motors are widely used in various industries. However, there are several problems with structure of motors: 1) no debug window is disposed on the control box, and connection between a power line or a signal line and a control board is troublesome, parameters of electronic components cannot be adjusted, and an impeller is disposed at a shaft end of the motor, which makes it difficult to fix a rotating shaft during installation, and causes great inconvenience for installation; 2) the control board is disposed in the control box, since space is small and the air does not flow therein, heat dissipation is a big problem, since power and heat dissipation of the pump motor are large, temperature raises quickly and becomes very high during operation, which causes that heat is difficult to be dissipated; 3) control functions thereof are comparatively simple, which makes them unable to meet requirements of users; 4) since the power line and the signal line extend from side wall of the control box, tightness thereof is not good enough, and installation and connection thereof are inconvenient; 5) structure thereof is unreasonable, control thereof is comparatively simple, and no communication interface is left, which makes it inconvenient to communicate with the outside world; and 6) no structure for fastening heat dissipation is disposed at the bottom of the control box.

SUMMARY OF THE INVENTION

In view of the above-described problem, it is an objective of the invention to provide a motor that is capable of addressing the above-mentioned problems.

To achieve the above objectives, in accordance with one embodiment of the invention, provided is a motor, comprising: a body, comprising a housing, a stator, and a rotor, and a controller, comprising a control box, and a control board, the body is disposed at the top of the motor, the controller is disposed at the bottom of the motor, the control board is disposed in the control box, a debug window is disposed on side wall or at the bottom of the control box, a sealing cover is disposed on the debug window, and the sealing cover can be opened, and the control board can be exposed for wire connection, adjustment of parameters of electronic components, and fixation of a rotating shaft according to requirements of users for installation and use.

In a class of this embodiment, a sealing pad is disposed between the sealing cover and the control box.

In a class of this embodiment, the control board in the controller employs an overlapped structure comprising an upper layer, and a lower layer, the upper layer of the control board is a power board bearing a power conversion circuit, and the lower layer of the control board is a control board bearing a direct current brushless motor control circuit.

In a class of this embodiment, a rotary dip switch is disposed at the bottom of the control box, the rotary dip switch is electrically connected to the control board, and the rotary dip switch controls different functions of the motor.

In a class of this embodiment, all heating components on the power board face upwards, a rectifier is tightly attached to a flange on side wall of the control box, an intelligent power module chip on the control board is tightly attached to the bottom of the control box, and the control box is made of aluminum.

In a class of this embodiment, a hole is disposed at the bottom of the control box, and operates to receive a LED, the LED is electrically connected to the control board, multiple protruding parts are disposed at the bottom of the control box, and a sealing washer is disposed between the control box and the lower end cover.

In a class of this embodiment, a hole is disposed at the bottom of the control box, a serial port disposed on the control board is disposed in the hole, and connected to an external circuit, the hole is a screw hole, and the screw hole is sealed via a plastic nut, and a sealing ring.

In a class of this embodiment, the housing comprises an upper end cover, a metal case with a heat dissipation fin, and a lower end cover. The upper end cover and the lower end cover are aluminum casting end covers, and the metal case is an expanding aluminum case.

In a class of this embodiment, the top of the control box is opening, the top of the control box is fit on the bottom of the lower end cover, part of the control box and that of the lower end cover extend from a side of the metal case and form a platform, a control cable and a power line enters the control box via the platform, and is connected to the power board via a terminal, and the power board is connected to the control board via a terminal in a manner of insertion.

In a class of this embodiment, the control cable and the power line are led out from the platform via a sealing screw joint and a nut. The sealing screw joint is fixed on the lower end cover via the nut, and a lead is in a complete sealing condition.

Advantages of the invention comprise: the debug window is disposed on the control box, which makes it convenient to open the sealing cover and to expose the debug window, to connect the power line and the control cable to the control board, and to adjust the parameters of the electronic components, and fixation of the rotating shaft via the debug window makes installation and debugging convenient.

BRIEF DESCRIPTION OF THE DRAWINGS

Further description of the invention will be given below in conjunction with accompanying drawings, in which.

DETAILED DESCRIPTION OF THE EMBODIMENTS

Further description of the invention will be given below in conjunction with specific embodiments and accompanying drawings.

Figure 1:
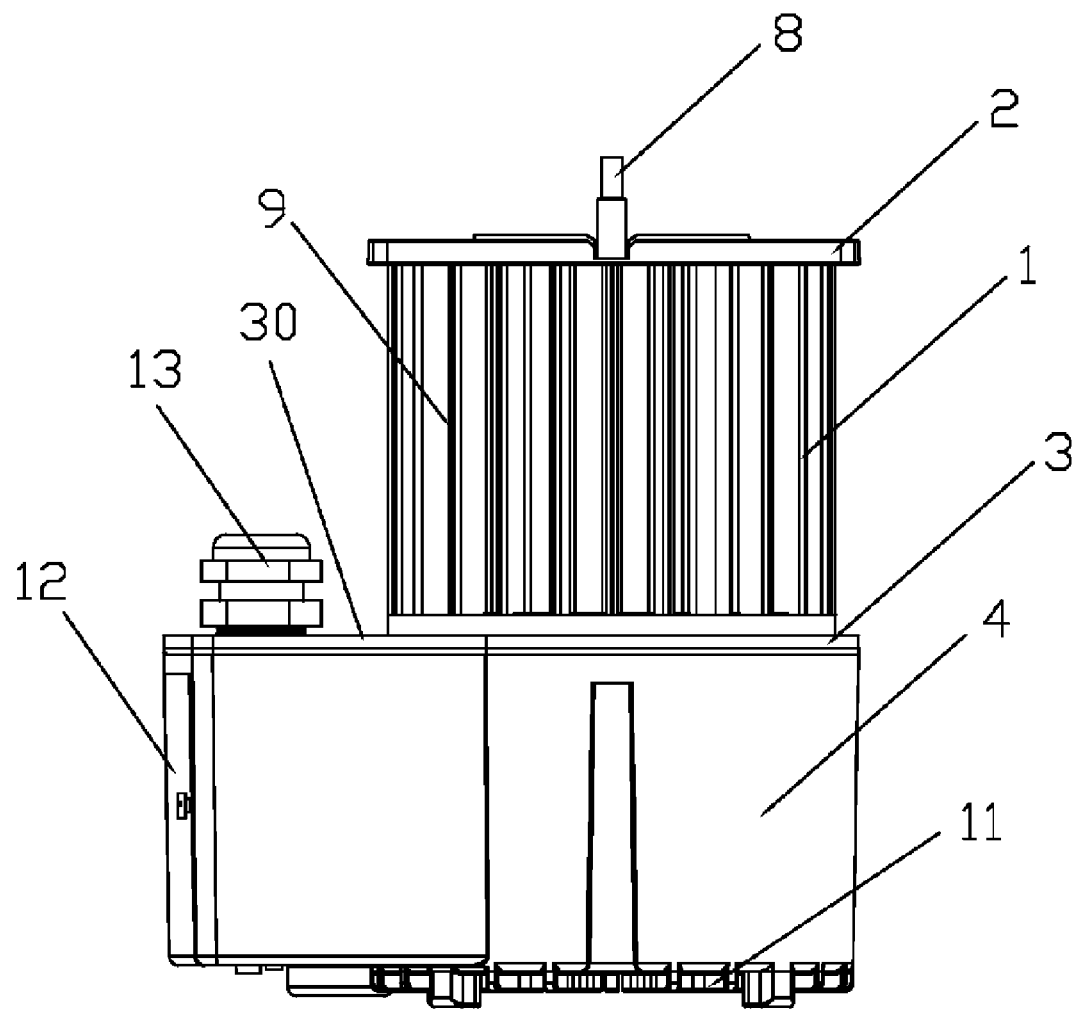
FIG. 1 is a perspective view of a motor of the invention.
Figure 2:
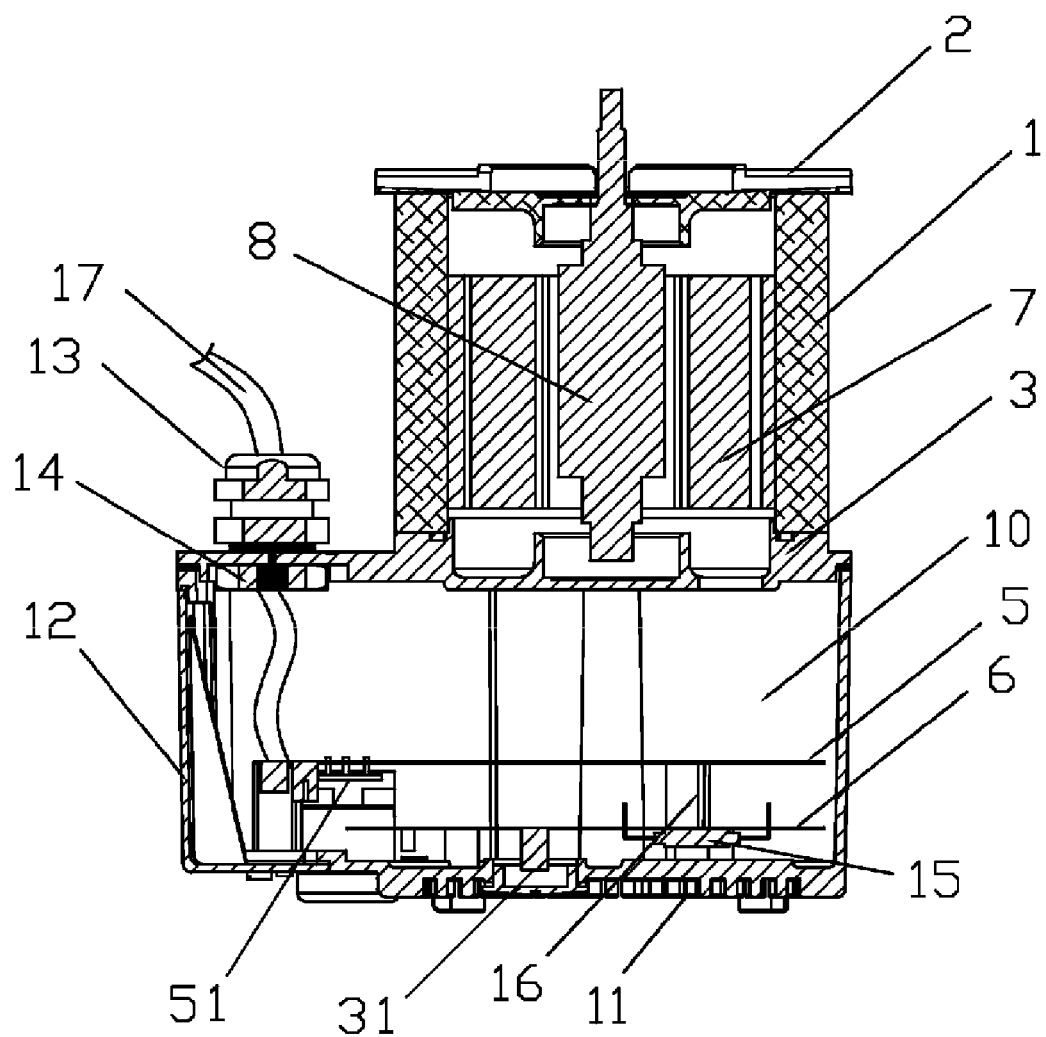
FIG. 2 is a cross-sectional view of a motor of the invention.
Figure 3:
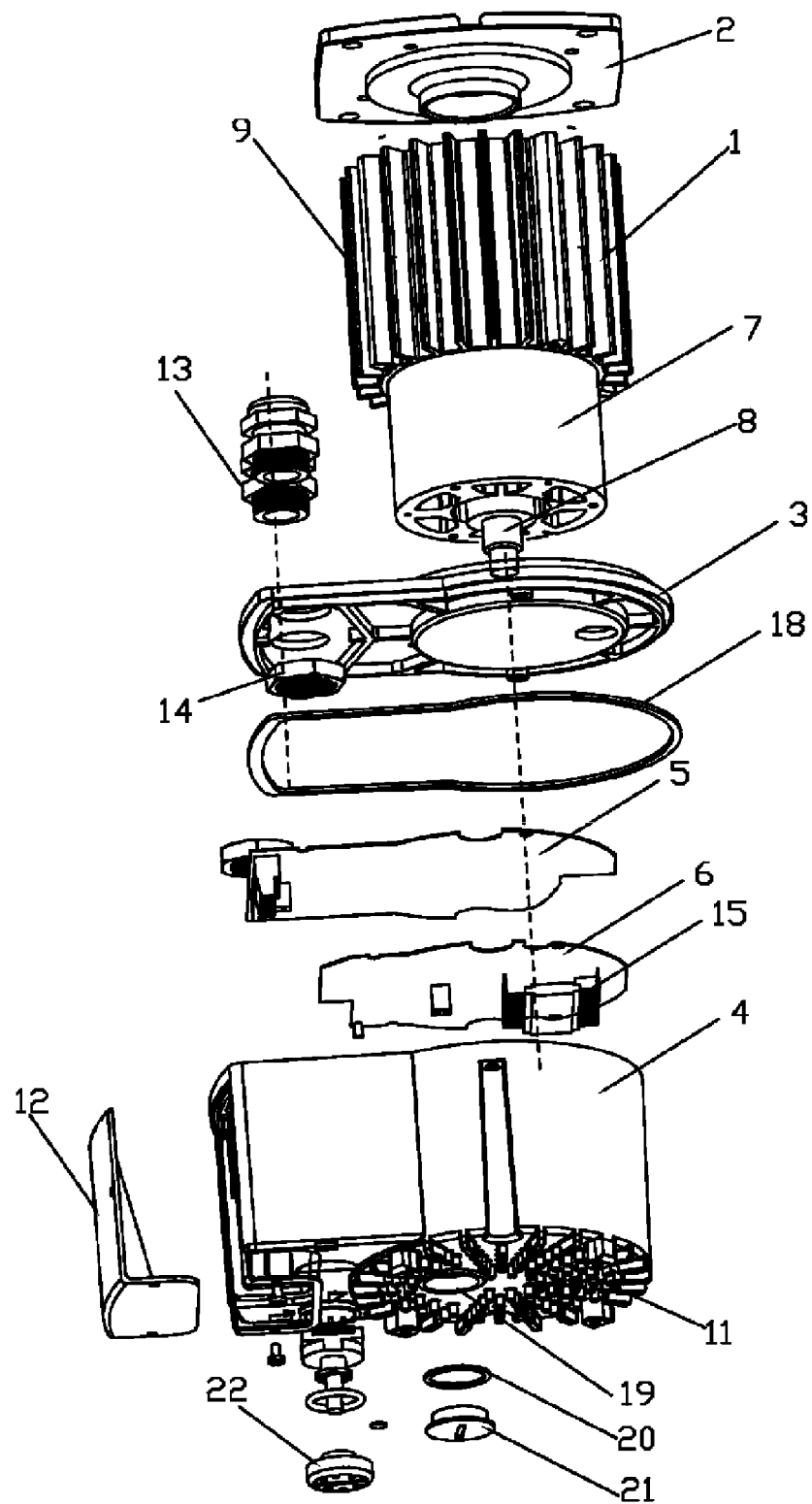
FIG. 3 is an exploded view of a motor of the invention.
Figure 4:
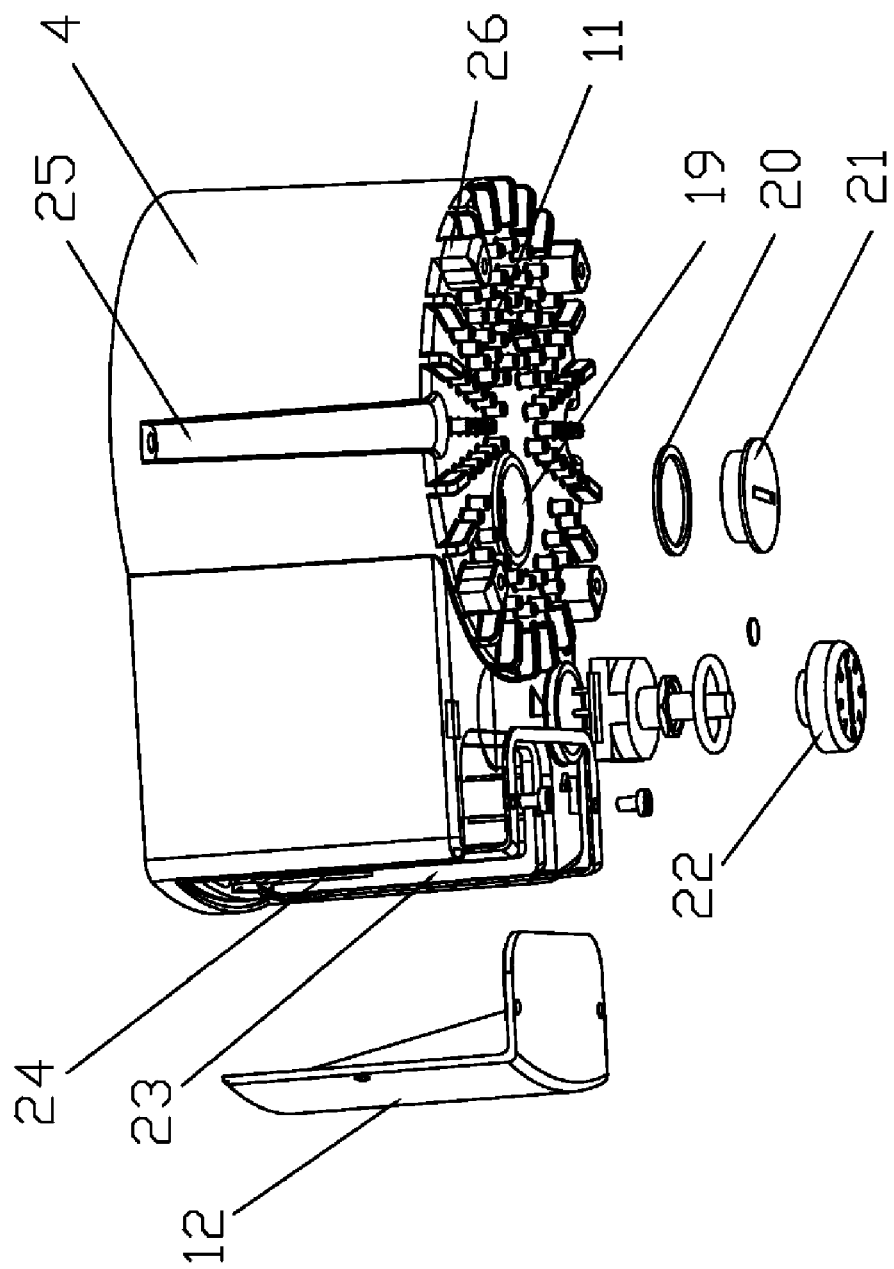
FIG. 4 is a partially enlarged view of a controller of the invention.
Figure 5:
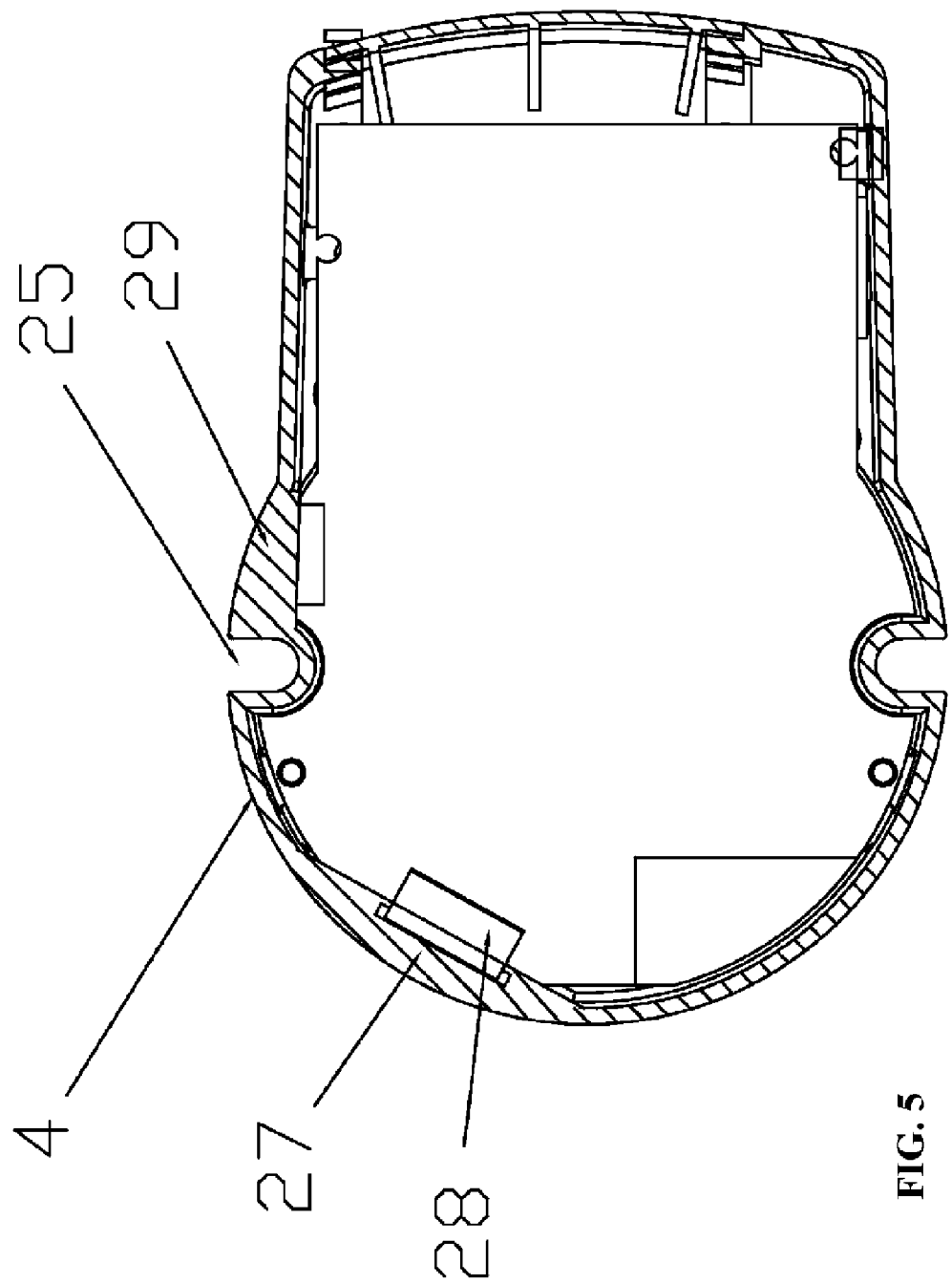
FIG. 5 is a cross-sectional view of a control box of the invention.
Figure 6:
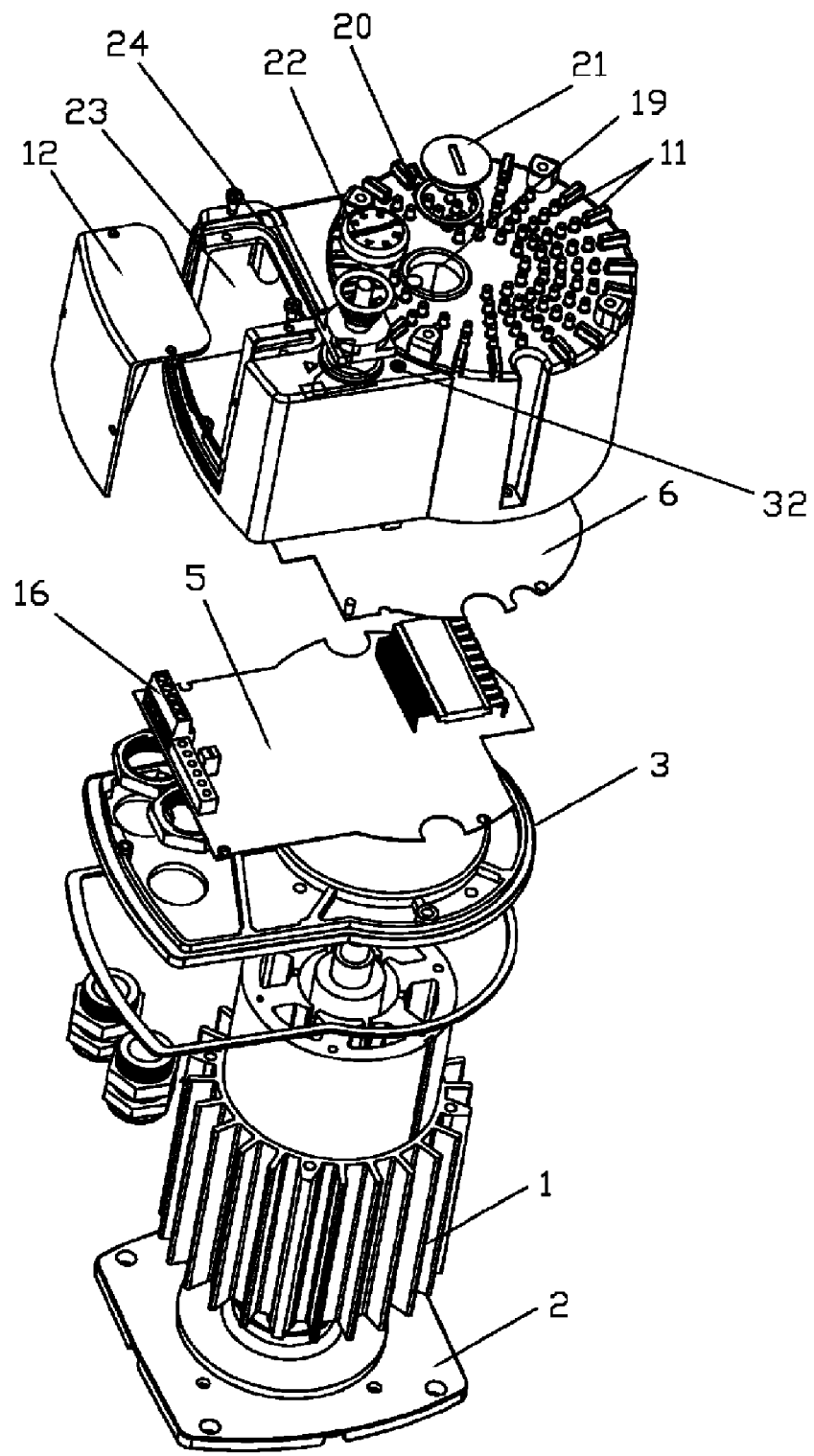
FIG. 6 is an exploded view of a motor of the invention from another angle.
Figure 7:
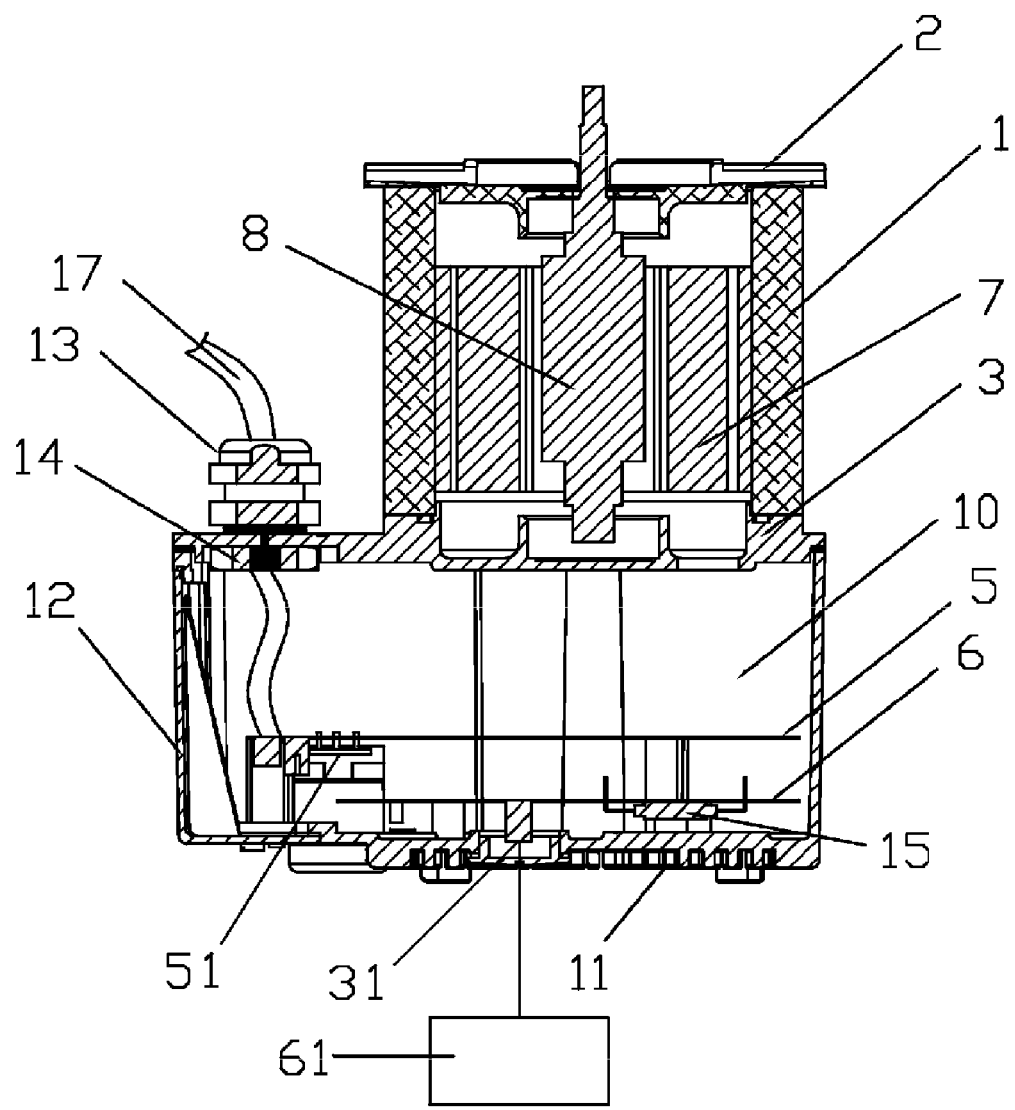
FIG. 7 is a schematic diagram showing the connection between the control box as claimed and the external equipment.

As shown in FIGS. 1-6, a motor of the invention comprises a body disposed at the top thereof, and a controller disposed at the bottom thereof. The body comprises a housing, a stator 7, and a rotor 8. The housing comprises an upper end cover 2, a metal case 1 with a heat dissipation fin 9, and a lower end cover 3. The stator 7 and the rotor 8 are disposed in the metal case 1, and the upper end cover 2 and the lower end cover 3 each has a bearing chamber for installing the rotor 8.

A debug window 23 is disposed on side wall or at the bottom of the control box 4, a sealing cover 12 is disposed on the debug window 23, the sealing cover 12 can be opened, and the control board can be exposed for wire connection, adjustment of parameters of electronic components, and fixation of a rotating shaft according to requirements of users for installation and use. A sealing pad 24 is disposed between the sealing cover 12 and the control box 4.

The controller comprises a control box 4, and a control board disposed in the control box 4. The control board in the controller employs an overlapped structure comprising an upper layer, and a lower layer, the upper layer of the control board is a power board 5 bearing a power conversion circuit, and the lower layer of the control board is a control board 6 bearing a direct current brushless motor control circuit. The top of the control box 4 is opening, the top of the control box 4 is fit on the bottom of the lower end cover 3, part of the control box 4 and that of the lower end cover 3 extend from a side of the metal case and form a platform 30, a control cable and a power line 17 enters the control box 4 via the platform, and is electrically connected to the power board 5, and the power board is connected to the control board via a terminal 16 in a manner of insertion. The control cable and the power line 17 are led out from the platform via a sealing screw joint 13 and a nut 14, the sealing screw joint 13 is fixed on the lower end cover 3 via the nut 14, and a lead is in a complete sealing condition. A rotary dip switch 22 is disposed at the bottom of the control box 4, the rotary dip switch 22 is electrically connected to a lower-layer control board 6, and the rotary dip switch 22 controls different functions of the motor. All heating components 51 on the power board 5 face upwards, a rectifier 28 is tightly attached to a flange 27 on the side wall, an intelligent power module chip 15 on the control board 6 is tightly attached to the bottom of the control box 4, and the control box 4 is made of aluminum, which features fast heat dissipation. A hole 19 is disposed at the bottom of the control box 4, a serial port 31 disposed on the control board 6 is disposed in the hole, and connected to an external circuit 61, the hole 19 is a screw hole, and the screw hole is sealed via a plastic nut 21, and a sealing ring 20. The upper end cover 2 and the lower end cover 3 are aluminum casting end covers, and the metal case 1 is an expanding aluminum case. A hole 19 is disposed at the bottom of the control box 4, and operates to receive an LED 32, the LED 32 is electrically connected to the control board, multiple protruding parts 11 are disposed at the bottom of the control box 4, and a sealing washer 18 is disposed between the control box 4 and the lower end cover 3, and operates to solve a waterproof and dustproof problem.

If a plastic cover 12 of the debug window 23 on the side wall of the control box 4 is opened, a socket for a power line, and that for a control cable are exposed, and a power line 17 can be connected thereto. The power line 17 is led out from the sealing screw joint 13 on the lower end cover 3, the sealing screw joint 13 is fixed on the lower end cover 3 via the nut 14, and the lead is in a complete sealing condition.

A groove 25 is disposed on one side of the control box 4, and another protruding part 29 is disposed on the control box 4, and operates to attach surface of overheated electronic components to the protruding part 29 whereby speeding up heat dissipation. A mounting foot 26 is disposed at the bottom of the control box 4, and multiple steps extend from inner side wall of the control box 4 and operate to support the control board 6 and the power board 5. A screw hole is disposed on top end surface of the step, and operates to fix the control board 6 and the power board 5 via a screw.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor, comprising:
a body, comprising a housing, a stator, and a rotor; and
a controller, comprising a control box and a control board; wherein:
said body is disposed at the top of said motor;
said controller is disposed at the bottom of said motor;
said control board is disposed in said control box;
a debug window is disposed on a side wall or at the bottom of said control box;
a sealing cover is disposed on said debug window;
said sealing cover can be opened so that said control board can be exposed for wire connection, adjustment of parameters of electronic components, and fixation of a rotating shaft according to requirements of users for installation and use;
said control board comprises an upper layer and a lower layer;
a power conversion circuit is disposed on said upper layer;
a direct current brushless motor control circuit is disposed on said lower layer;
a hole is disposed at the bottom of said control box, and operates to receive an LED;
said LED is electrically connected to said control board;
multiple protruding parts are disposed at the bottom of said control box; and
a sealing washer is disposed between said control box and said lower end cover.

2. A motor, comprising:
a body, comprising a housing, a stator, and a rotor; and
a controller, comprising a control box and a control board; wherein:
said body is disposed at the top of said motor;
said controller is disposed at the bottom of said motor;
said control board is disposed in said control box;
a debug window is disposed on a side wall or at the bottom of said control box;
a sealing cover is disposed on said debug window;
said sealing cover can be opened so that said control board can be exposed for wire connection, adjustment of parameters of electronic components, and fixation of a rotating shaft according to requirements of users for installation and use;
said control board comprises an upper layer and a lower layer;
a power conversion circuit is disposed on said upper layer;
a direct current brushless motor control circuit is disposed on said lower layer;

a hole is disposed at the bottom of said control box;
a serial port disposed on said lower layer is disposed in said hole, and connected to an external circuit;
said hole is a screw hole; and
said screw hole is sealed via a plastic nut and a sealing ring.

3. A motor, comprising:
a body, comprising a housing, a stator, and a rotor; and
a controller, comprising a control box and a control board; wherein:
said housing comprises an upper end cover, a metal case with a heat dissipation fin, and a lower end cover;
said body is disposed at the top of said motor;
said controller is disposed at the bottom of said motor;
said control board is disposed in said control box;
a debug window is disposed on a side wall or at the bottom of said control box;
a sealing cover is disposed on said debug window;
said sealing cover can be opened so that said control board can be exposed for wire connection, adjustment of parameters of electronic components, and fixation of a rotating shaft according to requirements of users for installation and use;
said control board comprises an upper layer and a lower layer;
a power conversion circuit is disposed on said upper layer;
a direct current brushless motor control circuit is disposed on said lower layer;
the top of said control box is an opening;
the top of said control box is fit on the bottom of said lower end cover;
a part of said control box and a part of said lower end cover extend from a side of said metal case and form a platform;
a control cable and a power line enters said control box via said platform, and is connected to said power board via a first terminal; and
said power board is connected to said control board via a second terminal in a manner of insertion.

4. The motor of claim 3, wherein
said control cable and said power line are led out from said platform via a sealing screw joint and a nut;
said sealing screw joint is fixed on said lower end cover via said nut; and
a lead is in a complete sealing condition.

5. The motor of claim 1, wherein a sealing pad is disposed between said sealing cover and said control box.

6. The motor of claim 1, wherein
a rotary dip switch is disposed at the bottom of said control box;
said rotary dip switch is electrically connected to said control board; and
said rotary dip switch controls different functions of the motor.

7. The motor of claim 1, wherein
all heating components on said power board face upwards;
a rectifier is attached to a flange on a side wall of said control box;
an intelligent power module chip on said control board is attached to the bottom of said control box; and
said control box is made of aluminum.

8. The motor of claim 1, wherein said housing comprises an upper end cover, a metal case with a heat dissipation fin, and a lower end cover.

* * * * *